(12) United States Patent
Kasai et al.

(10) Patent No.: US 8,162,217 B2
(45) Date of Patent: Apr. 24, 2012

(54) MAGNETIC CARD READER

(75) Inventors: Yoshiaki Kasai, Inagi (JP); Toshiyuki Kobayashi, Inagi (JP); Toshiyuki Ichikawa, Inagi (JP); Noboru Ishii, Inagi (JP)

(73) Assignee: Fujitsu Frontech Limited, Inagi-shi, Tokyo (JP)

( * ) Notice: Subject to any disclaimer, the term of this patent is extended or adjusted under 35 U.S.C. 154(b) by 0 days.

(21) Appl. No.: 13/191,868

(22) Filed: Jul. 27, 2011

(65) Prior Publication Data

US 2011/0278359 A1 Nov. 17, 2011

Related U.S. Application Data

(63) Continuation of application No. PCT/JP2009/059847, filed on May 29, 2009.

(51) Int. Cl.
*G06K 7/08* (2006.01)
(52) U.S. Cl. ........ 235/449; 235/375; 235/450; 235/475; 235/483; 235/486; 235/493
(58) Field of Classification Search ................. 235/375, 235/435, 446, 449, 475, 483, 486, 487, 493
See application file for complete search history.

(56) References Cited

U.S. PATENT DOCUMENTS

| | | | |
|---|---|---|---|
| 4,689,704 A * | 8/1987 | Holland-Letz | 360/240 |
| 5,646,392 A * | 7/1997 | Oguchi | 235/475 |
| 5,825,393 A * | 10/1998 | Kocznar et al. | 347/171 |
| 6,342,982 B1 * | 1/2002 | Kanayama et al. | 360/2 |
| 7,556,195 B2 * | 7/2009 | Ishii | 235/451 |

FOREIGN PATENT DOCUMENTS

| | | |
|---|---|---|
| JP | 2-308473 A | 12/1990 |
| JP | 5-012961 U | 2/1993 |
| JP | 2000-207878 A | 7/2000 |
| JP | 2006-065412 A | 3/2006 |

OTHER PUBLICATIONS

International Search Report of PCT/JP2009/059847, mailing date Jul. 7, 2009.

* cited by examiner

*Primary Examiner* — Tuyen K Vo
(74) *Attorney, Agent, or Firm* — Westerman, Hattori, Daniels & Adrian, LLP (57) ABSTRACT

A magnetic head is held by a side wall through a head fixing fitting so as to freely advance into and retreat from a card sliding groove. First and second head urging levers are swingably supported through a pin. In a standby state, the magnetic head is away from the card travel groove, and card engaging sections of the first and second head urging levers are staying in the card travel groove. When a magnetic card slides in a card sliding direction, the magnetic card makes contact with a card contact section to push the card contact section away from the card travel groove. This causes the first head urging lever to push out the magnetic head into the card travel groove so that the magnetic head makes contact with the magnetic card.

11 Claims, 6 Drawing Sheets

MAGNETIC CARD READER

This application is a continuing application, filed under 35 U.S.C. §111(a), of International Application PCT/JP2009/059847, filed on May 29, 2009.

FIELD

The embodiments discussed herein are related to a magnetic card reader.

BACKGROUND

Magnetic cards such as an employee ID card and a security card have been used, to which a magnetic stripe is attached for data storage. In a known magnetic card reader for reading data of such magnetic cards, a user slides a magnetic card manually therethrough (for example, see Japanese Laid-open Patent Publication No. 02-308473).

This magnetic card reader includes a card travel groove. The card travel groove has: a card sliding surface for guiding an edge of a magnetic card through the magnetic card reader; a pair of parallel side walls across the card sliding surface, one of the side walls having an opening; and a magnetic head for reading the data recorded on the magnetic stripe of the magnetic card. The magnetic head is supported by the one of the side walls movably in the retreating direction from the card travel groove in a state that the contact surface between the magnetic head and the magnetic stripe is staying in the card travel groove. When a user slides a magnetic card along the card travel groove from one end through the other end thereof, the magnetic card makes contact with the magnetic head staying in the card sliding groove. This causes the magnetic card to push the magnetic head away from the card travel groove. The magnetic head then makes contact with the magnetic stripe to read the data thereof.

This magnetic card reader further includes a mechanism for removing static charge. In this mechanism, electric conductors are arranged across the magnetic head in the card sliding direction so that the electric conductors make the static electricity charged in the magnetic card flow into a grounding terminal. The mechanism prevents the static electricity charged in the magnetic card from flowing into the magnetic head, thereby preventing poor reading and the damage to the electronic circuits connected to the magnetic head.

However, in manually-operable magnetic card readers, the face opposite to the card sliding surface is left open like a slot so that the magnetic card is slid by a user along the card sliding groove. Furthermore, the magnetic head is always staying in the card travel groove. As a result, when a magnetic card is inserted into the card travel groove toward the card sliding surface, the magnetic head may be mechanically damaged by the magnetic card.

SUMMARY

According to an aspect of the present invention, there is provided a magnetic card reader for reading data recorded in a magnetic card by sliding the magnetic card manually along a card sliding groove. The magnetic card reader includes: a magnetic head held away from the card sliding groove so as to freely advance into and retreat from the card sliding groove; and first and second head urging levers respectively disposed closer to a magnetic card inlet and a magnetic card outlet. In an initial state, one ends of the first and second head urging levers are staying in the card sliding groove, and the other ends thereof are staying behind the magnetic head. The first and second head urging levers are swingably supported through a pin so that the other ends thereof push out the magnetic head into the card sliding groove when the magnetic card pushes the one ends away from the card sliding groove.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will now be described with reference to the accompanying drawings. In each of the embodiments, the magnetic stripe of a magnetic card is made contact with the magnetic head of a card reader with a swipe of the magnetic card, so that the data of the magnetic card is read.

Figure 1:
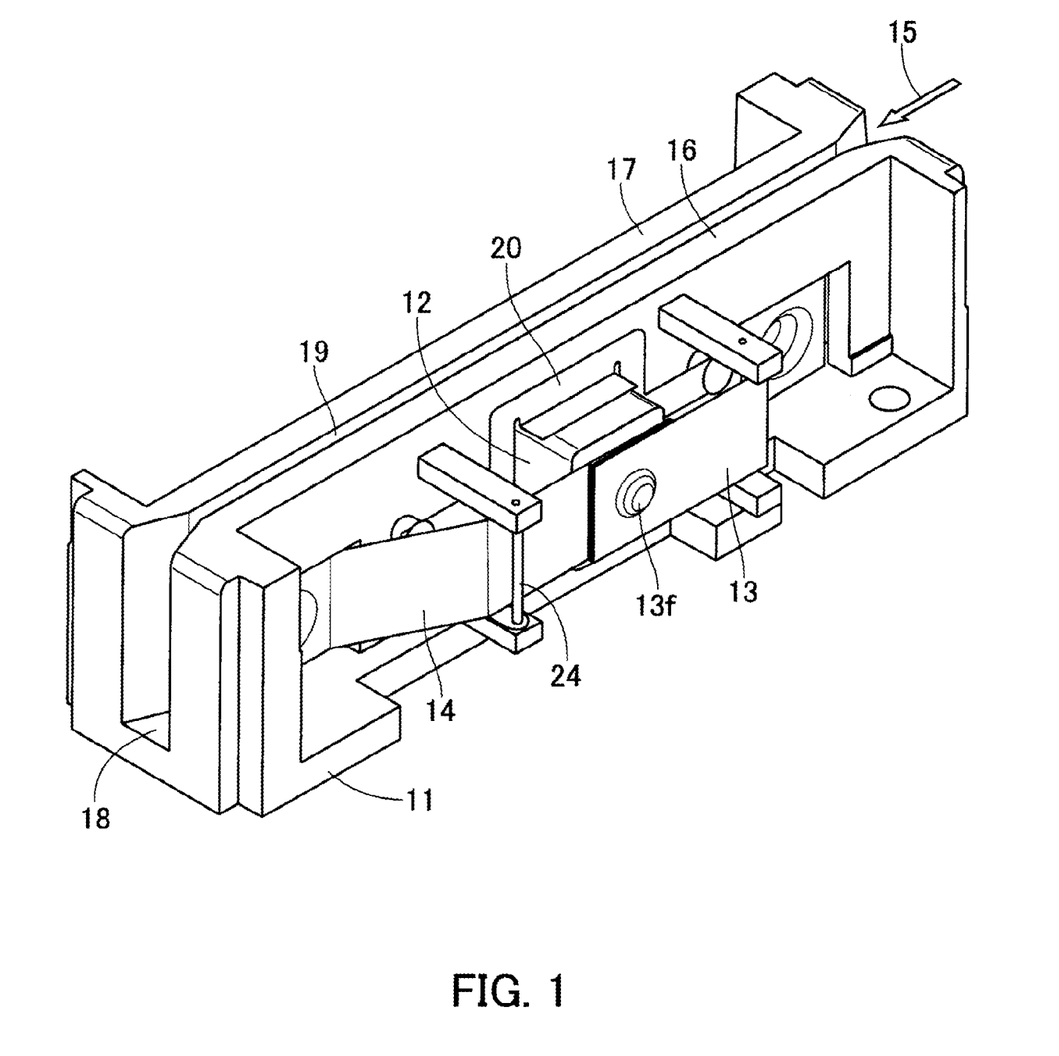
FIG. 1 is a perspective view illustrating the appearance of a magnetic card reader according to a first embodiment.
Figure 2:
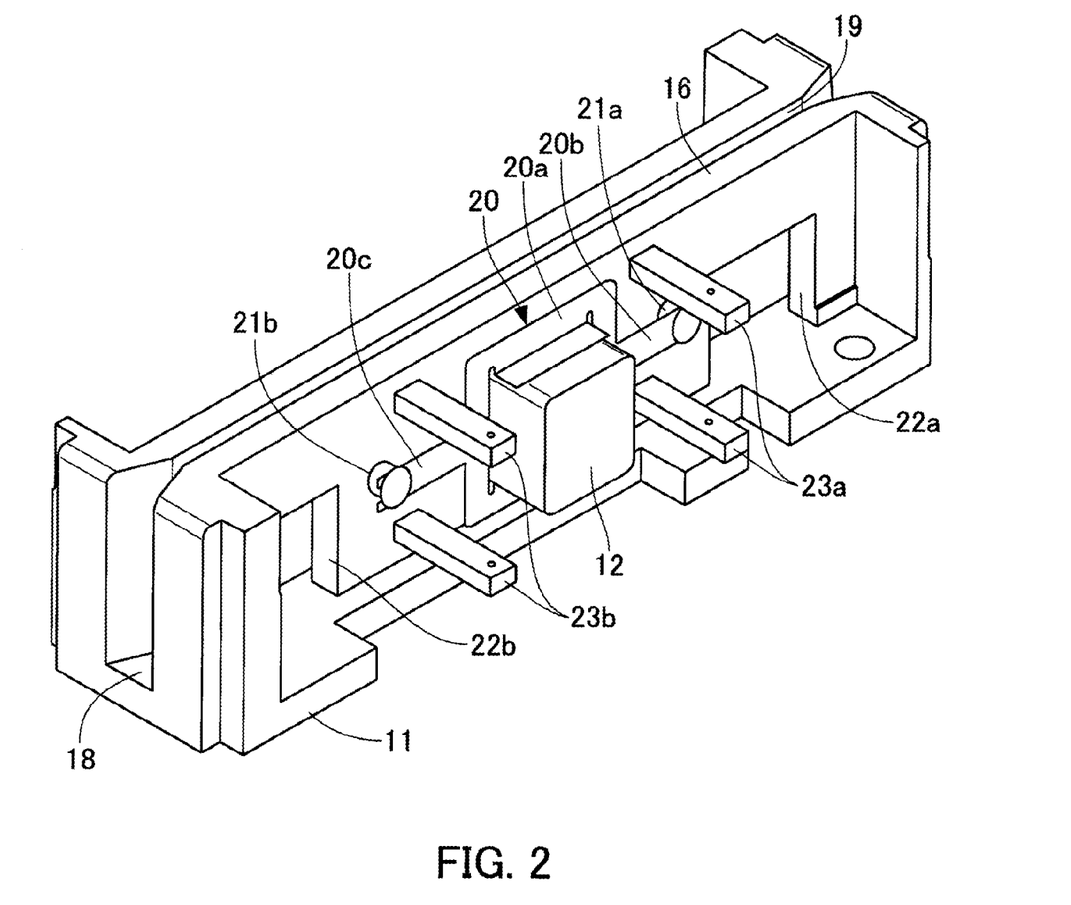
FIG. 2 is a perspective view illustrating the magnetic card reader according to the first embodiment, where head urging levers have not been attached thereto.
Figure 3A:
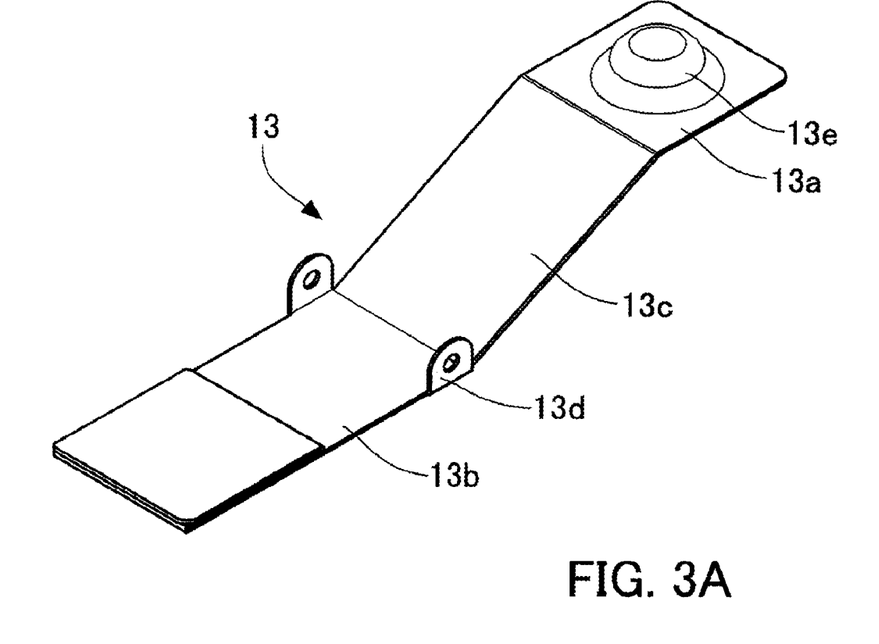
FIG. 3A is a perspective view illustrating a head urging lever provided closer to a magnetic card inlet.
Figure 3B:
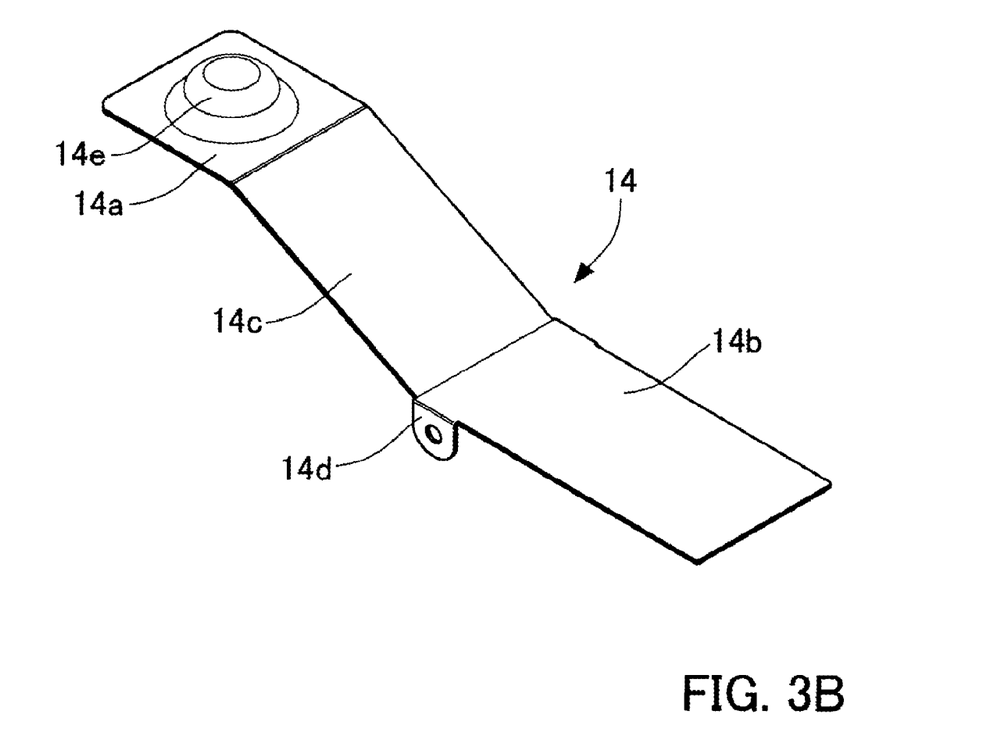
FIG. 3B is a perspective view illustrating another head urging lever provided closer to a magnetic card outlet.

FIG. 1 is a perspective view illustrating the appearance of a magnetic card reader according to a first embodiment. FIG. 2 is a perspective view illustrating the magnetic card reader according to the first embodiment, where head urging levers have not been attached thereto. FIG. 3A is a perspective view illustrating a head urging lever provided closer to a magnetic card inlet. FIG. 3B is a perspective view illustrating a head urging lever provided closer to a magnetic card outlet.

The magnetic card reader according to the first embodiment includes: a frame 11 formed of resin as one part; a magnetic head 12 for reading the data of a magnetic card; and first and second head urging levers 13 and 14 for changing the position of the magnetic head 12 in response to the position of the magnetic card.

The frame 11 includes a pair of side walls 16 and 17; and a card sliding surface 18 that extends in a card sliding direction 15. The side walls 16 and 17 and the card sliding surface 18 compose a card sliding groove 19 for guiding a magnetic card through the magnetic card reader. The side wall 16 has an opening (not shown) in a central portion thereof in the card sliding direction 15. The magnetic head 12 is supported in the opening with a head fixing fitting 20 so as to freely advance into and retreat from the card sliding groove 19. Specifically, as clearly illustrated in FIG. 2, the head fixing fitting 20 has a head fixing section 20a and arm sections 20b and 20c. The head fixing section 20a is fixed by welding to the magnetic head 12 in such a way that the magnetic head 12 penetrates the head fixing fitting 20. The arm sections 20b and 20c extend from both sides of the head fixing section 20a. The head fixing section 20a and the arm sections 20b and 20c are integrally formed of an elastic body such as a leaf spring. Distal ends of the arm sections 20b and 20c, that are remote from the head fixing section 20a, are fixed to bosses 21a and 21b sticking out from the side wall 16. In this structure, the magnetic head 12 is held by the side wall 16 through the head fixing fitting 20 so as to freely advance into and retreat from the card sliding groove 19. In an initial state, the magnetic head 12 is staying away from the card sliding groove 19.

In the magnetic card reader according to the first embodiment, the magnetic card 25 slides along the card sliding groove 19 in the card sliding direction 15 as illustrated in FIG. 1. At both ends of the card sliding groove 19, a magnetic card inlet and a magnetic card outlet are provided respectively, in the order from upper right to lower left in the card sliding direction 15. The magnetic card 25 is inserted into the magnet card inlet, and pulled out from the magnet card outlet.

The side wall 16 of the frame 11 has openings 22a and 22b closer to the magnetic card inlet and outlet, respectively. There are provided supports 23a and 23b between the magnetic head 12 and the openings 22a and 22b, respectively. The supports 23a and 23b swingably support the first and second head urging levers 13 and 14.

The first head urging lever 13 is provided closer to the magnetic card inlet. Referring to FIG. 3A, the first head urging lever 13 has a card engaging section 13a; a head engaging section 13b; a joining section 13c; and a supporting section 13d. The card engaging section 13a is provided at one end of the first head urging lever 13, and has a convex card contact section 13e that extends outward into the card sliding groove 19 through the opening 22a. The head engaging section 13b is provided at the other end of the first head urging lever 13. Referring to FIG. 1, a positioning projection 13f is provided on the surface of the first head urging lever 13, opposite to the card contact section 13e. In this embodiment, the card contact section 13e has a dome-shape.

The second head urging lever 14 is provided closer to the magnetic card outlet. Referring to FIG. 3B, the second head urging lever 14 has a card engaging section 14a; a head engaging section 14b; a joining section 14c; and a supporting section 14d. The card engaging section 14a of the second head urging lever 14 has a dome-shaped card contact section 14e that extends outward into the card sliding groove 19 through the opening 22b.

The first head urging lever 13 is swingably supported by the support 23a through a not shown pin. The second head urging lever 14 is swingably supported by the support 23b through a pin 24. On the back of the magnetic head 12, the head engaging section 14b of the second head urging lever 14 and the head engaging section 13b of the first head urging lever 13 are disposed in this order. The first and second head urging levers 13 and 14 are formed of a conductive elastic body such as a metal leaf spring. The card contact sections 13e and 14e are integrally formed with the card engaging sections 13a and 14a by pressing the card engaging sections 13a and 14a thereinto, but may be formed by attaching a separated part as the card engaging sections 13a and 14a. Although the card contact sections 13e and 14e have a dome-shape, the card contact sections 13e and 14e may be a half ellipsoid-shape that has the major axis in the card sliding direction 15 so as to have a larger contact area with the magnetic card. Furthermore, the head engaging section 14b of the second head urging lever 14 and the head engaging section 13b of the first head urging lever 13 may be disposed in the reverse order on the back of the magnetic head.

Figure 4:
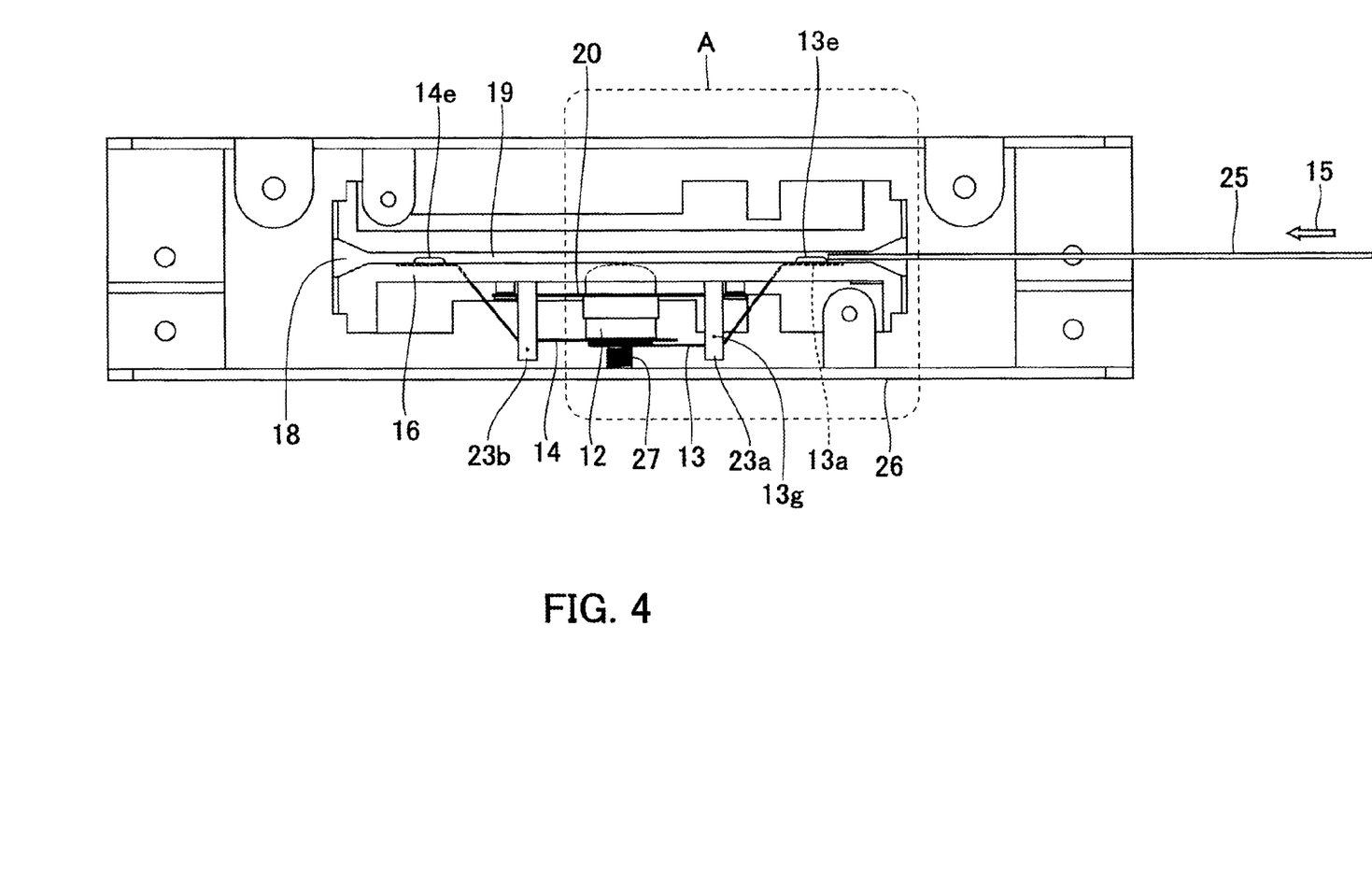
FIG. 4 is a plan view illustrating the magnetic card reader according to the first embodiment, where the magnetic card reader has been attached to a card reading apparatus.
Figure 5:
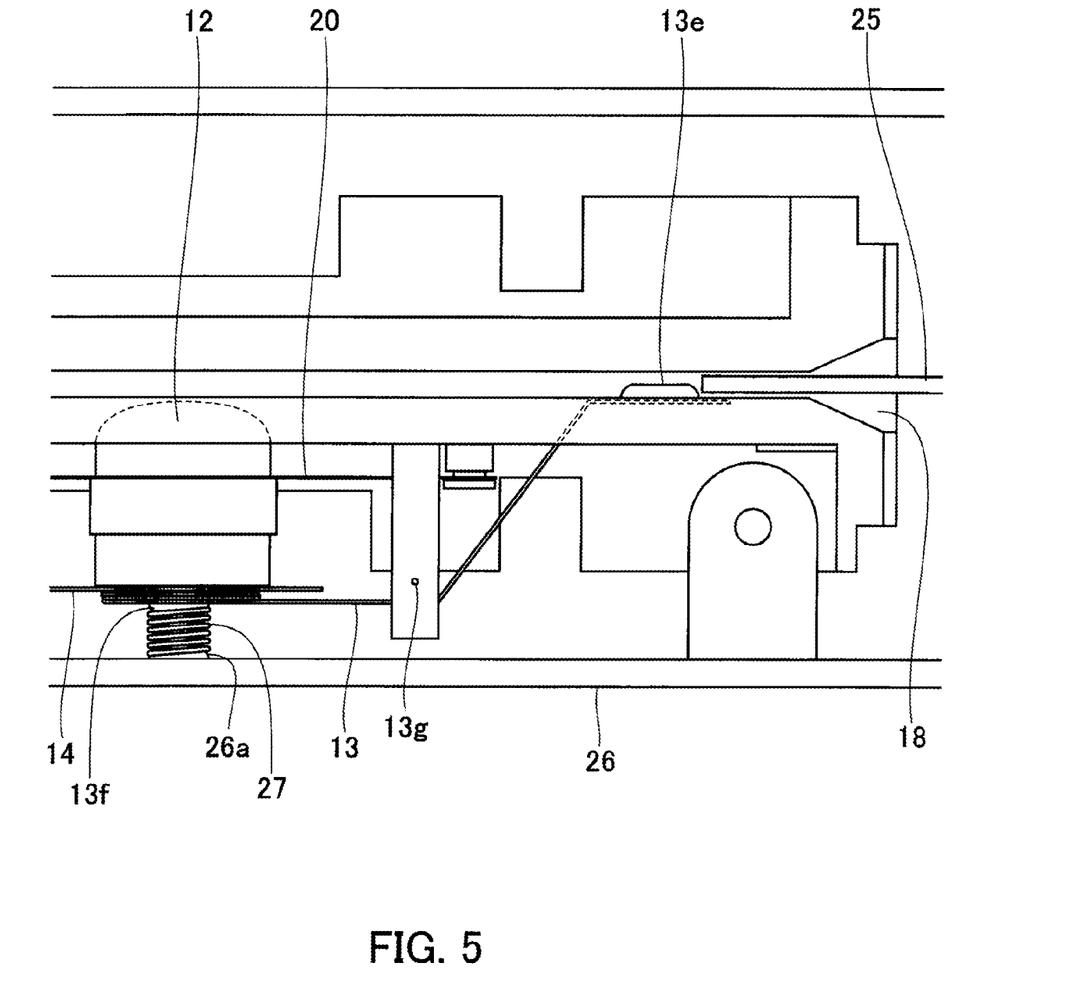
FIG. 5 is a partially enlarged view illustrating the area A of FIG. 4.

FIG. 4 is a plan view illustrating the magnetic card reader according to the first embodiment, where the magnetic card reader has been attached to a card reading apparatus. FIG. 5 is a partially enlarged view illustrating the area A surrounded by dotted line in FIG. 4. In FIGS. 4 and 5, a covering is omitted for understanding.

In an initial state where a magnetic card 25 has not been inserted into the magnetic card reader, the magnetic head 12 is away from the card sliding groove 19, and the card contact sections 13e and 14e are staying in the card sliding groove 19. The magnetic card reader is attached to a conductive main body frame 26 of a card reading apparatus, and a coiled spring 27 is interposed between the head engaging section 13b of the first head urging lever 13 and the main body frame 26. The coiled spring 27 is supported by the positioning projection 13f of the first head urging lever 13 and a positioning projection 26a of the main body frame 26, at both ends of the coiled spring 27. The coiled spring 27 is formed of a conductive spring material so that the first and second head urging levers 13 and 14 and the main body frame 26 are electrically connected. The coiled spring 27 brings the head engaging sections 13b and 14b of the first and second head urging levers 13 and 14 into contact with the magnetic head 12, thereby advancing the card contact sections 13e and 14e of the card engaging sections 13a and 14a into the card sliding groove 19 to a predetermined depth, and connecting the card contact sections 13e and 14e of the card engaging sections 13a and 14a with the main body frame 26 electrically. Therefore, the coiled spring 27 may be replaced by leaf springs.

As illustrated in FIG. 4, in a standby state where the magnetic card 25 is not read, the magnetic head 12 has been retreated from the card sliding groove 19 by the head fixing fitting 20, and the card contact sections 13e and 14e of the first and second head urging levers 13 and 14 are staying in the card sliding groove 19 through the openings 22a and 22b, respectively. Even in the case where the magnetic card 25 is inserted into the card sliding groove 19 toward the card sliding surface 18, the magnetic card 25 does not collide with the magnetic head 12. Therefore, the magnetic head 12 is not likely to be damaged even when the magnetic card 25 is not inserted properly from the magnetic card inlet.

When the magnetic card 25 slides on the card sliding surface 18 along the card sliding groove 19, the leading edge of the magnetic card 25 makes contact with the card contact section 13e of the first head urging lever 13 provided closer to the magnetic card inlet. When the magnetic card 25 slides further, the card contact section 13e is retreated from the card sliding groove 19 by the magnetic card 25. The first head urging lever 13 turns on a pin 13g in the clockwise direction, so that the head engaging section 13b, together with the head engaging section 14b of the second head urging lever 14, pushes out the magnetic head 12 into the card sliding groove 19 against the elastic force of the head fixing fitting 20.

The magnetic head 12 has been pushed out into the card sliding groove 19, and the magnetic card 25 has slid along the card sliding groove 19. The magnetic head 12 and the magnetic stripe of the magnetic card 25 then makes contact with each other, so that the data recorded in the magnetic stripe is read. This state is maintained until the trailing edge of the magnetic card 25 passes by the card contact section 13e of the first head urging lever 13. However, this state is further maintained, during which the data of the magnetic card 25 is being read. The reason is as follows. The card contact section 14e of the second head urging lever 14 is disposed so that the leading edge of the magnetic card 25 passes by the card contact section 14e of the second head urging lever 14 before the trailing edge of the magnetic card 25 passes by the card contact section 13e of the first head urging lever 13. Specifically, the distance between the card contact section 13e and the card contact section 14e is shorter than the length of the magnetic card 25 in the card sliding direction 15. After the trailing edge of the magnetic card 25 passes by the card contact section 13e of the first head urging lever 13, the first head urging lever 13 is released from the pressure caused by the magnetic card 25. However, the head engaging section 13b of the first head urging lever 13 is pressed against the head engaging section 14b of the second head urging lever 14 by the coiled spring 27, so the same state as when the magnetic card 25 passes by the card contact section 13e is further maintained.

After the trailing edge of the magnetic card 25 passes by the card contact section 14e of the second head urging lever 14, the magnetic head 12 returns to the standby state. Specifically, the magnetic head 12 has been retreated from the card sliding groove 19 by the elastic force of the head fixing fitting 20.

The first and second head urging levers 13 and 14 and the coiled spring 27 have conductivity. The coiled spring 27 is electrically connected to the conductive main body frame 26. Suppose that a magnetic card 25 has built up static electricity. When the card contact section 13e of the first head urging lever 13 makes contact with the magnetic card 25, the static electricity charged in the magnetic card 25 flows to the main body frame 26 through the first head urging lever 13 and the coiled spring 27. This means that the static electricity of the magnetic card 25 is removed before the magnetic card 25 makes contact with the magnetic head 12. In the magnetic card reader according to the first embodiment, the static charge of the magnetic card 25 is removed by using the first and second head urging levers 13 and 14 so that the magnetic head 12 is not damaged. Therefore, no mechanism for removing the static charge of the magnetic card 25 is necessary.

Figure 6:
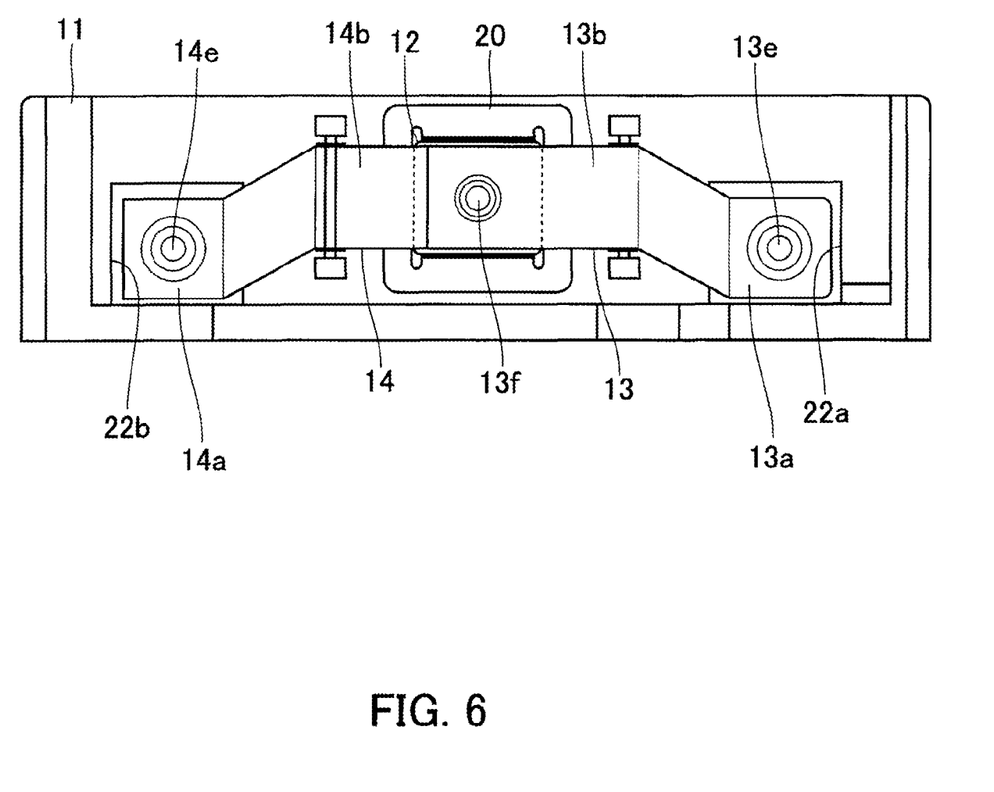
FIG. 6 illustrates a magnetic card reader according to a second embodiment.

FIG. 6 illustrates a magnetic card reader according to a second embodiment. In FIG. 6, the same elements as those shown in FIGS. 1 to 5 are assigned the same reference numerals, and descriptions thereof are omitted here.

The magnetic card reader according to the second embodiment further reduces the risk that the magnetic card might collide with the magnetic head 12 when the magnetic card 25 is inserted into the card sliding groove 19 toward the card sliding surface 18. Specifically, in this magnetic card reader, first and second head urging levers 13 and 14 have joining sections 13c and 14c which extend obliquely downward relative to the center line extending in the longitudinal direction of the head engaging sections 13b and 14b. Therefore, the card contact sections 13e and 14e are sufficiently lower than the top level of the magnetic head 12, with reference to the card sliding surface 18.

The positions of the card contact sections 13e and 14e are displaced to be closer to the card sliding surface 18 relative to the magnetic head 12. The magnetic card reader according to the second embodiment reduces the risk that the magnetic head 12 might advance into the card sliding groove 19 before the magnetic card 25 reaches the top of the magnetic head 12. Because when the card contact section 13e or 14e is in contact with the magnetic card 25, the magnetic card 25 has already passed by the magnetic head 12. Furthermore, even in the case where the magnetic card 25 is inserted into the card sliding groove 19 toward the card sliding surface 18 in a state in which the magnetic card 25 is some inclined to the card sliding surface 18, the magnetic card 25 passes by the magnetic head 12 and then makes contact with the card contact section 13e or 14e.

The above embodiments provide the magnetic head 12 only in the side wall 16 of the card sliding groove 19. The embodiments are not limited to that specific example, but may be modified to provide magnetic heads 12 in both side walls 16 and 17, respectively.

In the magnetic card reader having the above structure, the magnetic head does not advance into the card sliding groove unless a magnetic card makes contact with the first and second head urging levers. Therefore, the magnetic head is not damaged not only by a magnetic card but also other types of cards.

The magnetic card reader having the above structure has the conductive first head urging lever provided closer to the magnetic card inlet section. Therefore, the static charge of a magnetic card is removed without any mechanism therefor before the magnetic card makes contact with the magnetic head. This prevents poor reading and the damage to the magnetic head.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A magnetic card reader for reading data recorded in a magnetic card, comprising;
   a card sliding groove along which the magnetic card slides manually;
   a magnetic card inlet and a magnetic card outlet which are provided at both end of the card sliding groove, the magnetic card being inserted from the magnetic card inlet and pulled out from the magnetic card outlet;
   a magnetic head held away from the card sliding groove, so as to freely advance into and retreat from the card sliding groove; and
   first and second head urging levers disposed closer to the magnetic card inlet and outlet respectively, wherein
   one ends of the first and second head urging levers being staying in the card sliding groove, other ends thereof being staying behind the magnetic head in an initial state, and the first and second head urging levers are swingably supported through a pin so that the other ends each push out the magnetic head into the card sliding groove when the magnetic card pushes each of the one ends away from the card sliding groove.

2. The magnetic card reader according to claim 1, wherein the first and second head urging levers each have a convex card contact section at the one end thereof, which has advanced into the card sliding groove in the initial state.

3. The magnetic card reader according to claim 2, wherein the convex card contact sections each have a dome-shape.

4. The magnetic card reader according to claim 2, wherein the convex card contact sections each have a half ellipsoid-shape with a major axis in a card sliding direction.

5. The magnetic card reader according to claim 2, wherein the convex card contact sections are lower than the magnetic head, with reference to a card sliding surface of the card sliding groove.

6. The magnetic card reader according to claim 2, wherein the distance between the convex card contact sections at the one ends of the first and second head urging levers is shorter than the length of the magnetic card in the card sliding direction.

7. The magnetic card reader according to claim 1, wherein the other end of the second head urging lever provided closer to the magnetic card outlet and the other end of the first head urging lever provided closer to the magnetic card inlet are disposed on a back of the magnetic head in this order.

8. The magnetic card reader according to claim 1, wherein the other end of the first head urging lever provided closer to the magnetic card inlet and the other end of the second head urging lever provided closer to the magnetic card outlet are disposed on a back of the magnetic head in this order.

9. The magnetic card reader according to claim 1, wherein the first and second head urging levers are formed of a leaf spring.

10. The magnetic card reader according to claim 1, wherein the other ends of the first and second head urging levers are urged by an elastic body so that the other ends make contact with the back of the magnetic head.

11. The magnetic card reader according to claim 10, wherein at least the first head urging lever of the first and second head urging levers and the elastic body have conductivity, which compose a mechanism for removing static charge.

* * * * *